Aug. 14, 1951  F. WALLER ET AL  2,563,892
APPARATUS FOR LOCATING IMAGES ON SCREENS
Filed Dec. 14, 1946  4 Sheets-Sheet 1
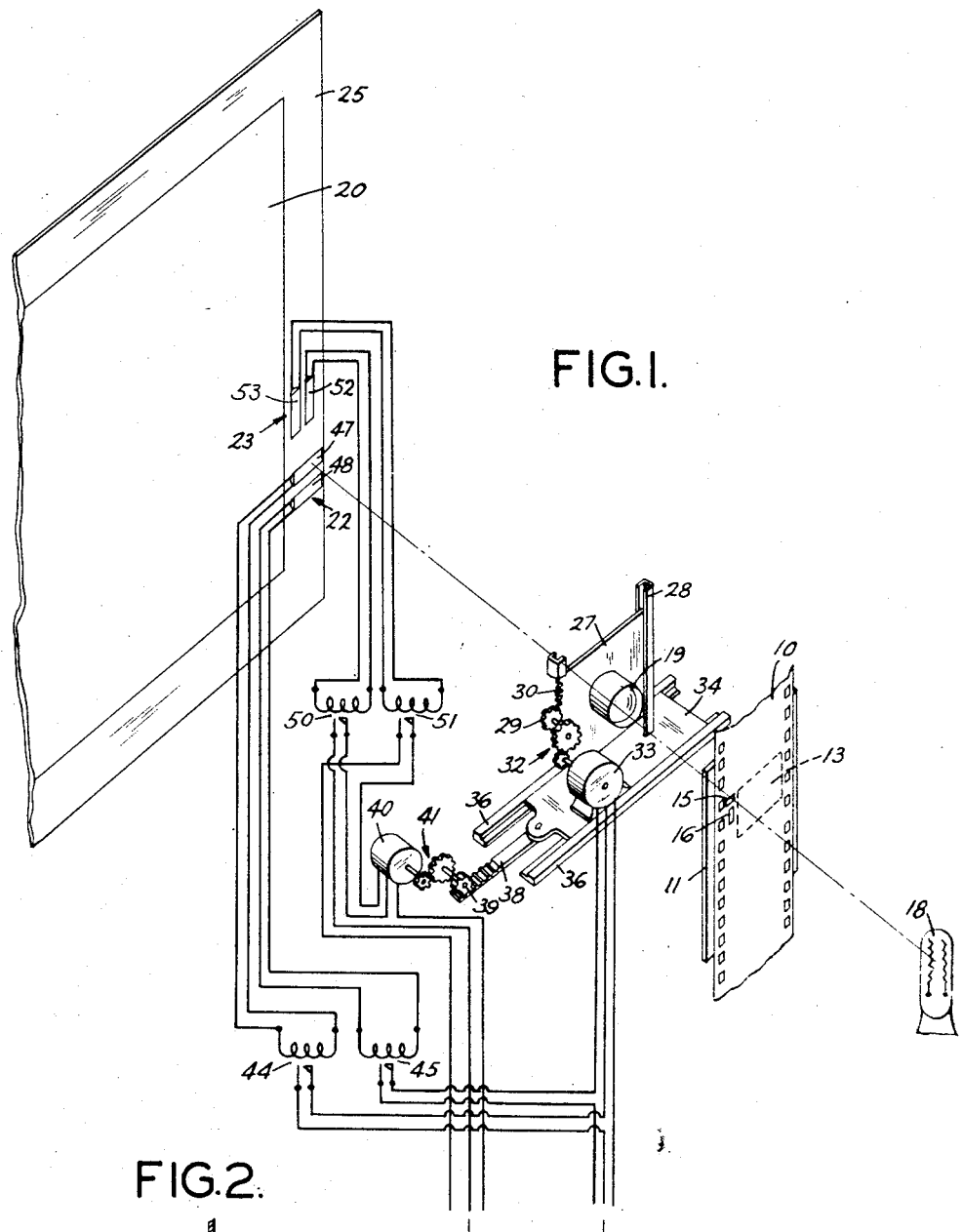
FIG.1.
FIG.2.
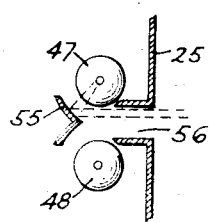
INVENTORS
*Fred Waller and*
*Willis Robert Dresser*
BY
ATTORNEYS Aug. 14, 1951  F. WALLER ET AL  2,563,892
APPARATUS FOR LOCATING IMAGES ON SCREENS
Filed Dec. 14, 1946  4 Sheets-Sheet 2
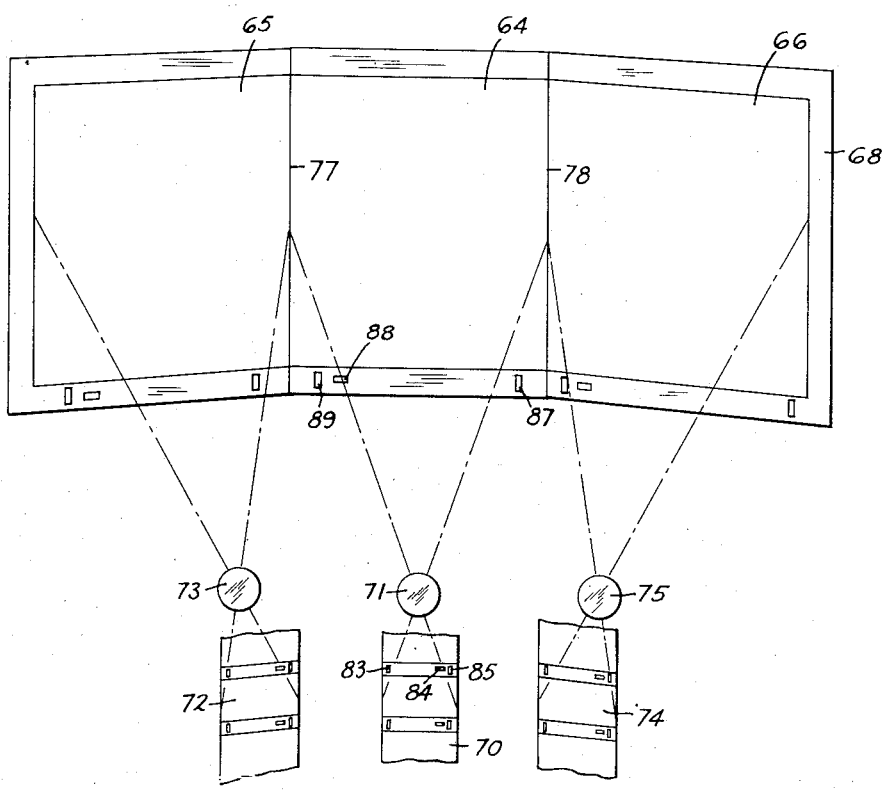
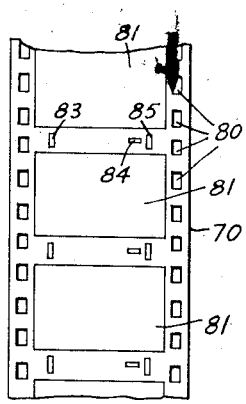
INVENTORS
Fred Waller and
BY Willis Robert Dresser
Emery Varney
Whittemore & Dix
ATTORNEYS Aug. 14, 1951  F. WALLER ET AL  2,563,892
APPARATUS FOR LOCATING IMAGES ON SCREENS
Filed Dec. 14, 1946  4 Sheets-Sheet 3
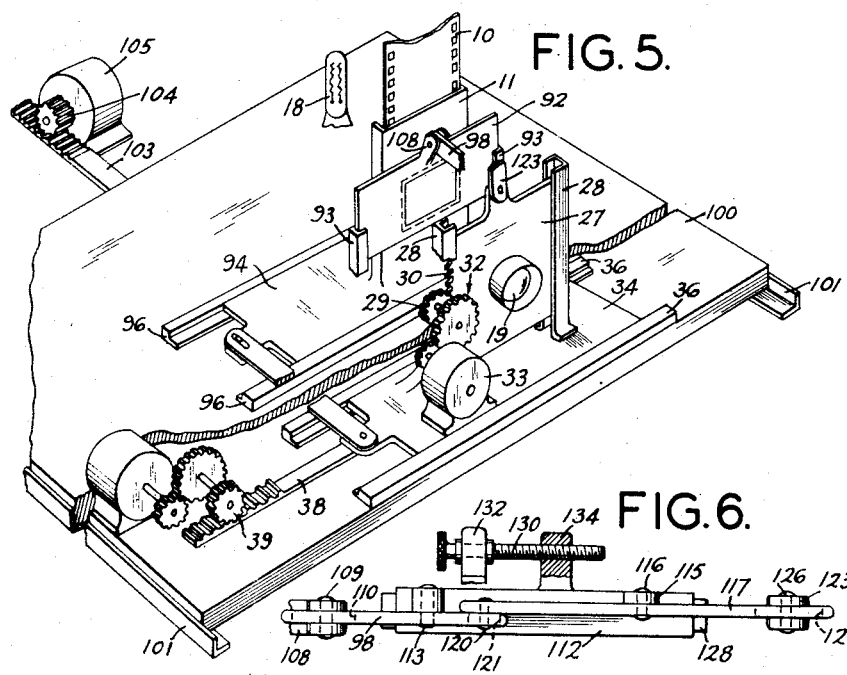
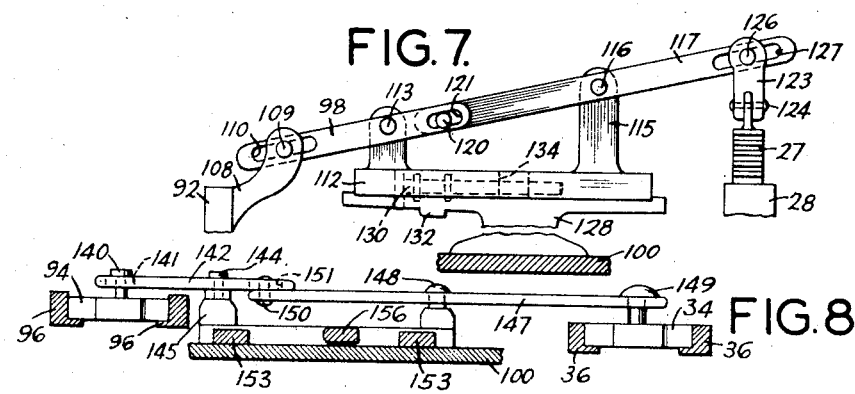
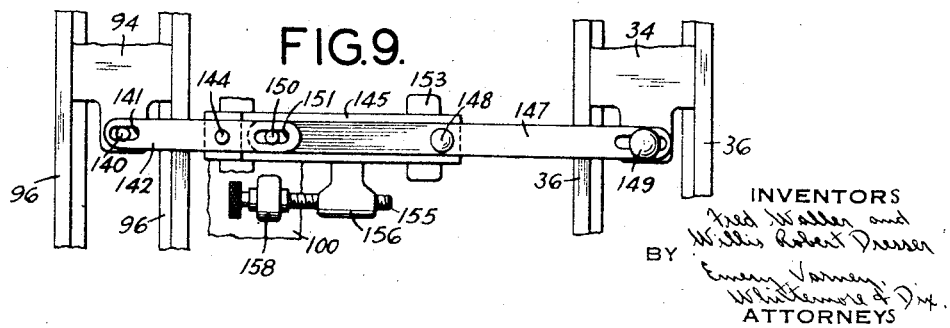

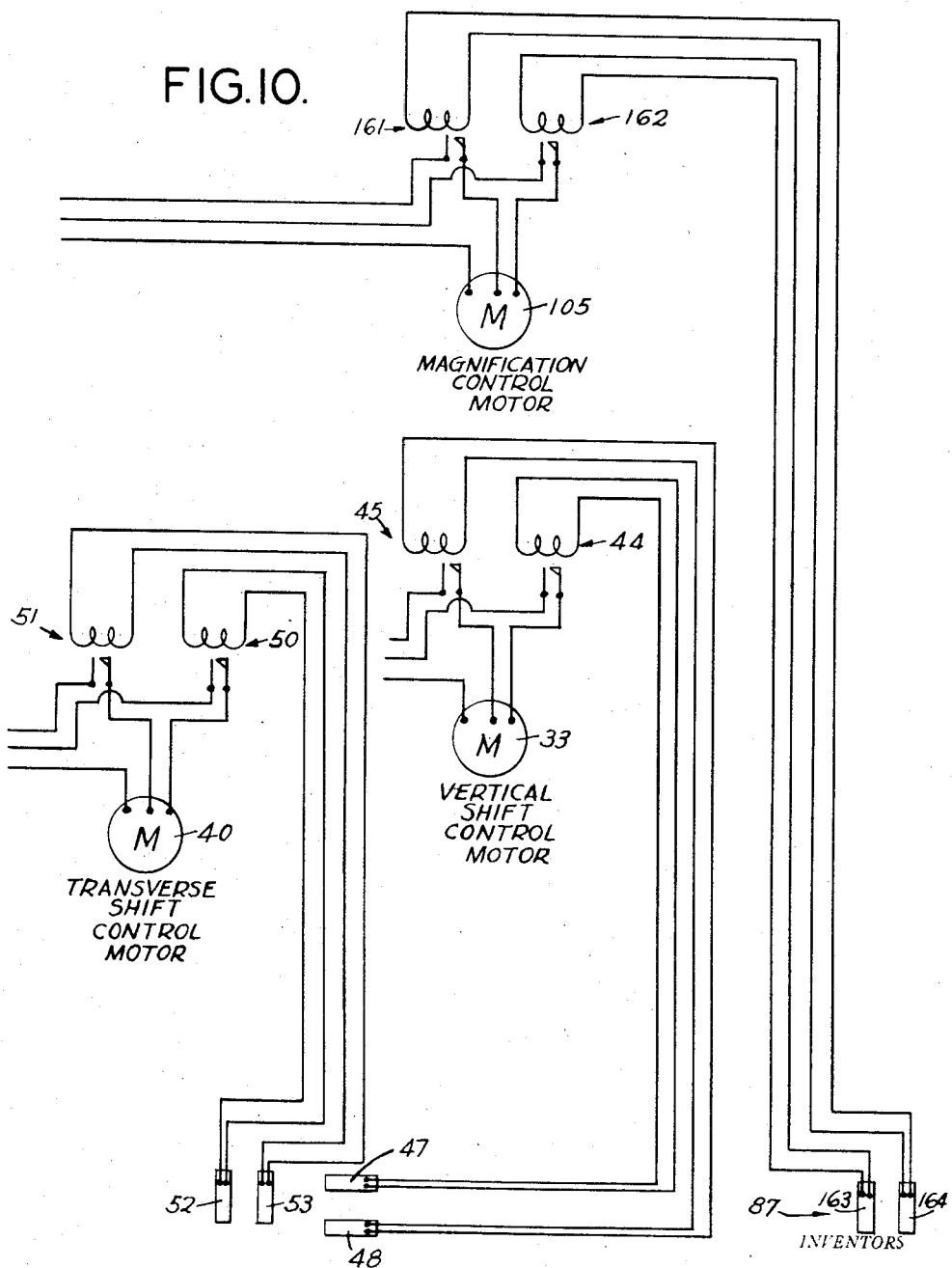

Patented Aug. 14, 1951

2,563,892

UNITED STATES PATENT OFFICE 2,563,892

APPARATUS FOR LOCATING IMAGES ON SCREENS

Fred Waller, Huntington, N. Y., and Willis Robert Dresser, Long Hill, Conn.

Application December 14, 1946, Serial No. 716,344

14 Claims. (Cl. 88—16.6)

This invention relates to motion picture projection and the invention is intended primarily for controlling the projection where several images are thrown on contiguous areas of the same screen. In such cases it is essential that the different images be located with great exactness since the composite images are seriously impaired if any one of the individual images overlaps an adjacent image or does not completely fill its intended area of the screen.

When a number of images are projected on a single large screen for the purpose of producing a composite picture, it is usual to employ different projectors for projecting the respective images. Experience has shown that it is not sufficient to merely adjust the apparatus initially for the correct correlation and magnification of the images from the different projectors, because the film is not entirely uniform. The location of the image on the film sometimes varies along the length of the film, and the actual dimensions of the film vary at times from shrinkage and other causes that make both the image location and magnification vary.

In its broadest aspects it is an object of this invention to provide improved projection apparatus for motion picture film, and especially for the projection of the individual images used to make up larger composite images on screens of large area.

Another object is to control automatically the location of a projected image on a screen so as to maintain the position of the image substantially unchanged regardless of variation in the relative position of the image on the film. The control is preferably obtained by means of light apertures in the film cooperating with photoelectric cells in the frame around the screen or adjacent the screen on which the image is projected.

Any variation of the location of the image on the screen can be corrected either by moving the film or by moving the lens through which the images are projected. The mechanical difficulty met with in moving the film is that the film can be guided accurately only at the regions where it is bent. Where the film is flat it is not stiff enough to be pushed into different positions effectively. Moving the lens, therefore, makes possible more accurate location of the image.

When the lens is moved to compensate for variation in the position of the film image, the side edge of the image formed by the film gate is also shifted unless some compensating means are provided. This invention controls image location by moving the lens, but provides apparatus for moving the same film gate in the direction to prevent the lens movement from changing the location of the edges of the field illuminated by the projected image.

Another object of the invention is to provide automatic control of the magnification of the film image of a motion picture film so that the image fills a predetermined area of a screen regardless of variation in the actual dimensions of the film frames.

In the preferred embodiment of the invention, automatic control of image location and magnification are combined so as to maintain registration of adjacent images and proper illumination of the full area of the screen section that each image is intended to cover.

Other objects, features and advantages will appear or be pointed out as the specification proceeds.

In the drawings, forming a part hereof, in which like reference characters indicate corresponding parts in all the views, Figure 1 is a diagrammatic view illustrating the application of the invention to the control of the location of an image on a single screen.

Figure 2 is a detailed diagrammatic view showing the location of the photocells used in the combination illustrated in Figure 1.

Figure 3 is a diagrammatic view illustrating the application of the invention to the control of both the location and magnification of a number of images projected from different films on a large-area screen to form a composite picture.

Figure 4 is an enlarged detailed view of one of the films used in Figure 3.

Figure 5 is a perspective, diagrammatic view of projection apparatus for controlling the location and magnification of the respective images projected in Figure 3.

Figures 6 to 9 are detail views of the compensating linkages used with the projection apparatus of Figure 5.

Figure 10 is a wiring diagram showing the circuits by which the photocell controls operate the motors of the apparatus illustrated in Figure 5.

Figure 1 shows a motion picture film 10 which runs through projection apparatus having a guide 11 for the left hand edge of the film. One film frame 13 is illustrated, but it will be understood that the film has a plurality of successive frames. The film 10 has two light apertures 15 and 16 associated with each frame and located along the left hand margin of the film.

Light from a light source 18 passes through the film frame 13, and through the light apertures 15 and 16 to a lens 19 which projects the image of the film frame on a screen 20. The light passing through the apertures 15 and 16 is focused by the lens 19 on light responsive means 22 and 23 respectively, located along one side of the screen 20, and preferably embedded in a frame 25 that surrounds the screen 20.

The lens 19 is carried by a lense mount 27 which is movable vertically in guides 28. The lens mount 27 is moved up and down in the guides 28 by a pinion 29 meshing with a rack 30 secured to one edge of the lens mount 27. The pinion 29 is driven by reduction gearing 32 from an electric motor 33 mounted on a base 34.

The base 34 is supported by guides 36 and is slidable horizontally along the guides 36, such horizontal movement being in a direction transverse of the light beam by which the film is projected on the screen. The base 34 is connected with a rack 38 driven by a pinion 39 from an electric motor 40 through reduction gearing 41.

The electric motors 33 and 40 are reversible and their direction of movement is controlled by relays. The motor 33 is connected with relays 44 and 45. These relays are operated by separate photocells 47 and 48, respectively, of the light responsive means 22.

When the image of the light aperture 15 strikes both of the photocells 47 and 48 with equal intensity, both of the relays 44 and 45 are closed and the motor 33 remains stationary. When the image of the light aperture 15 is high and concentrates illumination on the photocell 47, the relay 44 remains closed while the relay 45 opens and the motor 33 moves the lens mount 27 down until the photocells 47 and 48 are both illuminated substantially equally and the image is restored to its proper location. Downward movement of the image of the light aperture 15 so as to concentrate the illumination on the photocell 48 causes relay 44 to open while relay 45 remains closed and energizes the motor 33 to rotate in a direction to raise the lens mount 27 and restore the image on the screen to the desired location.

The operation and direction of rotation of the motor 40 is controlled by relays 50 and 51 connected with photocells 52 and 53 respectively of the light responsive means 23. Shifting of the image of the light aperture 16 so as to concentrate the illumination on only one of the photocells 52 and 53 causes one or the other of the relays 50 and 51 to open while the other remains closed and causes the motor 40 to operate to shift the base 34 and lens mount 27 in a direction to restore the image of the light aperture 16 to the desired location.

Figure 2 shows a construction in which the photocells 47 and 48 are located behind the frame 25 of the screen. A reflector 55 is located in line with an opening 56 in the frame 25, and this reflector has two reflecting surfaces that are set at an angle to the axis of the opening 56 so that one-half of the rays of light entering the opening 56 are reflected to the photocell 47 and the other half to the photocell 48. The reflecting surfaces are preferably curved to concentrate the light on the photocells 47 and 48.

In positioning the photocells, it is advantageous to have the long dimension of each photocell at right angles to the direction of movement which the photocell controls. For example, in Figure 1, the photocells 47 and 48 which control the vertical movement of the image are positioned with their long dimensions extending horizontally. This orientation results in the most rapid change in illuminaton intensity for a given displacement of the control beam. Conversely, the photocells 52 and 53, which control horizontal movement of the image, are positioned with their long dimensions extending vertically.

Figure 3 shows a large screen having a center area 64 and contiguous areas 65 and 66 on the left and right, respectively, of the center area 64. This screen is surrounded by a frame 68. Images are projected on the areas 64, 65 and 66 from separate projectors which are represented in the drawing by an illustration of a film strip and lens. Frame images of a film 70 are projected on the center screen area 64 through a lens 71. The screen area 65 is illuminated by the images of a film 72 projected through a lense 73, and images on a film 74 are projected on the screen area 66 through a lens 75. The images on the screen area 64 and 66 meet along a line 77 and the image on the center area 64 meets the image on the right hand area 66 along a line 78.

In order to have the different images on the screen of Figure 3 appear as a single picture it is essential that the images from the respective projectors be not only correctly located both horizontally and vertically so as to meet exactly along the lines 77 and 78, but it is also essential that the images have the proper magnification so as to fill the intended areas of the screen. For example, if the film 70, or some portion of it, has shrunk so that the image of the film frame, as projected on the center section 64, is not quite wide enough to fill in the distance between the lines 77 and 78, then image locating apparatus, such as described in connection with Figure 1, cannot make the image on the center section register with the images on the areas 65 and 66 at the same time.

This invention provides for automatic control of the magnification by light responsive means which cooperate with light apertures in the film. Such apparatus moves the projector lens toward or from the screen to change the magnification and at the same time provides a constant focus with a focus follow-up device similar to the focus control connections used on conventional enlargers.

Figure 4 shows the film 70 on an enlarged scale. This film has conventional apertures 80 for receiving the teeth of the film-driving sprockets of the projector, but the film frames 81 are spaced so as to leave margins between them. In these margins there are light apertures 83, 84 and 85. Two of these apertures, for example the apertures 84 and 85, are used to control the location of the image, in the manner described in connection with Figure 1, and the remaining light aperture 83 is used to control the magnification of the image. The reason for having the light apertures 83, 84 and 85 in the margin between the film frames 81 is that it permits the light responsive devices, with which these light apertures cooperate, to be located in the frame of a screen used for composite pictures, as in Figure 3.

The light responsive means on which the images of the light apertures 83, 84 and 85 are thrown are indicated in Figure 3 by the reference characters 87, 88 and 89 respectively. Similar light responsive means are located in the frame 68 under the screen areas 65 and 66.

Figure 5 is a diagrammatic showing of the projection apparatus used for projecting the film 70 in Figure 3. Similar projection apparatus is used for each of the films 72 and 74. Much of the apparatus shown in Figure 5 is the same as shown in Figure 1, and is designated by the same reference characters, but the motor and adjusting mechanism in the apparatus of Figure 5 are located on the opposite side of the lens from the structure shown in Figure 1.

The projection apparatus of Figure 5 includes, in addition to the structure already described in connection with Figure 1, a film gate 92 that serves as a mask for determining the limits or marginal edges of the image projected on the screen. The film gate 92 is supported in guides 93 carried by a slide 94 which is movable horizontally in guides 96. These guides 96 extend parallel to the guides 36; and the base 34 is connected with the slide 94 by a linkage which causes the slide 94 to move whenever the base 34 moves along its guides 36. The linkage connecting the base 34 and slide 94 will be described in connection with Figures 8 and 9, and for the present it is sufficient to understand that the slide 94 moves in the same direction as the base 34 but for a longer, and proportional, distance which is so correlated with the movement of the base 34 that the edges of the projected image, as determined by the edges of the opening through film gate 92, remain in the same position on the screen in spite of horizontal movement of the lens 19.

The film gate 92 is movable vertically in the guides 93 and is supported by a link 98 connected by other links with the lens mount 27. This linkage, will be described in connection with Figures 6 and 7 and for the present it is sufficient to understand that vertical movement of the lens mount 27 in the guides 28 causes the film gate 92 to move up and down in the guides 93 in the same direction as the movement of the lens mount 27 but for a distance greater than the movement of the lens and so correlated with the movement of the lens that the edges of the projected image, as determined by the top and bottom edges of the film gate 92, are not influenced by the vertical movement of the lens 19.

The entire projector mechanism and lens-adjusting apparatus is supported on a base 100 which slides in guides 101 toward and from the screen. A rack 103 is attached to the base 100 and meshes with a pinion 104 that is driven by a motor 105 for moving the base 100 along its guides 101. The movement of the base 100, along the guides 101 changes the magnification of the image. The lens 19 can be moved back and forth in the lens mount 27 by any suitable focus follow control mechanism for maintaining the focus of the image in spite of changes in the magnification.

Figures 6 and 7 show the linkage between the film gate 92 and the lens mount 27. The film gate 92 has a yoke 108 at its upper end, and this yoke 108 is connected with the link 98 by a pin 109 extending through a slot 110 in the rearward end portion of the link 98.

The link 98 is suported from a bracket 112 by a fulcrum pin 113. At the forward end of the bracket 112 there is a yoke 115 with a pin 116 which serves as a fulcrum for another link 117. Motion of the link 117 is transmitted to the link 98 by a pin 120 which extends from one side of the link 117 into a slot 121 in the forward end portion of the link 98.

The forward end of the link 117 is connected to the lens mount 27 by an intermediate link 123. This intermediate link is secured to the lens mount 27 by a pivot connection 124 and the upper end of the intermediate link 123 is connected with the link 117 by a pin 126 extending through a slot 127 in the forward end of the link 117.

The lever arms of the link 117 are substantially equal, and the lever arms of the link 98 are so related that the ratio of the length of the forward arm to the length of the longer rearward arm of the link 98 is equal to the ratio of the distance of the lens 19 from the screen to the distance between the film and the screen. It is not necessary that the link 117 have arms of equal length and it is sufficient that the leverage of the compound lever system which connects the lens mount with the film gate be so correlated with the distances between the lens and screen, and the film and the screen, that the edges of the image on the screen, as determined by the film gate, will not be moved as a result of movement of the lens mount.

Since the respective distances of the lens and the film from the screen do not remain in the same ratio for all operating conditions of the projector, it is preferable to have the leverage of the compound lever system adjustable. The bracket 112 is supported by a stand 128 which is rigidly secured to the base 100. The bracket 112 is movable along the stand 128 as a guide toward and from the film gate 92 and lens mount 28. The bracket 112 is shifted by turning an adjusting screw 130

The adjusting screw 130 is rotatable in a bearing 132 which is part of the stand 112. This screw is held against axial movement with respect to the bearing 132 by collars on the screw. The forward end of the screw 130 threads through a lug 134 connected to the bracket 112 for moving the bracket along the stand 128. This movement of the bracket 112 does not distort connections between the leverage system and the film gate 92 and lens mount 27 because the pins 109 and 126 extend through slots in the links 98 and 117. This forward or rearward adjustment of the bracket 112 does change the leverage of the system, however, since it changes the effective lengths of the forward lever arm of link 117 and the rearward lever arm of link 98, and these changes are opposite to one another, that is, one lever arm gets shorter as the other gets longer, thus changing the leverage of the system.

Figures 8 and 9 show the linkage connecting the base 34 with the slide 94. A stud 140 extends up from the slide 94 and through a slot 141 in a link 142. This link 142 is movable angularly in a horizontal plane about a fulcrum pin 144 secured to a bracket 145, and the links 142 and 147 are connected by a pin 150 secured to the link 147 and extending through a slot 151 in the upper link 142. The forward end of the link 147 is slotted and a pin 149 extends through this slot and connects the link with the base 34.

The bracket 145 is slidable in guides 153 on the base 100, and can be adjusted by a screw 155 extending through a lug 156 which forms a part of the bracket 145. The screw 155 is held against axial displacement by collars on opposite sides of a lug 15 of the projector base 100.

Adjustment of the screw 155 in Figures 8 and 9 moves the bracket 145 and changes the leverage of the composite lever system by which the slide 94 is connected with the base 34.

Figure 10 shows a wiring diagram for controlling the apparatus illustrated in Figure 5. Vertical movement of the lens mount for image location is controlled by photoelectric cells 47 and 48, and horizontal movement of the lens and its supporting structure for image location is controlled by photoelectric cells 52 and 53 as in the apparatus shown in Figure 1. The third motor 105 for operating the magnification control is connected with relays 161 and 162 in the circuits of photocells 163 and 164 respectively. As in the case of the image control motors, the motor 105 does not run when light is supplied to both of the photocells 163 and 164 and the relays 161 and 162 are both closed. When the photocell 163 only receives light, the motor 105 is operated in one direction, and when the photocell 164 only receives light, the motor 105 is operated in the opposite direction.

It will be understood that the film 10 in Figure 1 is used with a film gate, and that linkages such as shown in Figures 5 to 9 are employed for preventing movement of the edges of the illuminated field on the screen when the lens 19 is moved by the image locating controls.

The way in which the magnification control can be effected by a single pair of photocells is best understood by referring to Figure 3. The image location controls move the lens so that the images of the light apertures 84 and 85 register with the light responsive devices 88 and 89, and maintain the left-hand edge of the projected image even with the line 77. With the position of this line definitely located, the magnification of the image can be determined by the movement of the image of the light aperture 83. If this image falls to the right of the light responsive means 87 in Figure 3 the magnification is too great, and if it falls to the left of the light responsive means 87, the magnification is insufficient. The magnification control circuit shown in Figure 10 will operate the motor 105 and adjust the magnification until the image of the light aperture 83 registers with the light responsive means 87.

The preferred embodiments of the invention which have been described obtain image location by moving the lens, but the invention can be modified to move the film, or the projector. Other changes and modifications can be made and some features of the invention can be used without others.

We claim:

1. The combination with a motion picture projector having a lens and a film gate that serves as a mask for determining the edges of the image projected on a screen, of image location control apparatus including mechanism with light-responsive control means for automatically adjusting the lens vertically to cause a vertical shifting of the image on a screen in response to vertical displacement of a control beam projected from the film, other mechanism with light-responsive control means for automatically adjusting the lens horizontally to cause a horizontal shifting of the image on the screen in response to horizontal displacement of a control beam projected from the film and compensating connections between the lens and the film gate for moving the film gate in such a correlation with the lens movement that the margins of the image on the screen, as determined by the film gate, remain unchanged with different vertical and horizontal adjustments of the lens.

2. Projection apparatus including a lens mount, supporting means for the lens mount movable to adjust the lens vertically, a film gate for determining the edges of an image projected on a screen through a film located at the gate, and a motion-transmitting connection between said supporting means and the film gate for moving the film gate vertically and in the same direction as the vertical movement of the lens mount, but for a different vertical distance from that moved by the lens mount.

3. Projection apparatus including a mount for a lens through which an image is projected on a screen, supporting means for the lens mount movable to adjust the lens vertically, a film gate for determining the edges of an image projected on a screen through a film located at the gate, and a motion transmitting connection between said supporting means and the film gate for moving the film gate vertically and in the same direction as the vertical movement of the lens mount, said motion transmitting connection being proportioned to move the film gate by a distance equal to the lens movement multiplied by the ratio of the gate spacing from the screen to the lens spacing from the screen.

4. Projection apparatus including a mount for a lens through which an image is projected on a screen, supporting means for the lens mount movable to adjust the lens horizontally, a film gate for determining the edges of an image projected on a screen through a film located at the gate, and a motion transmitting connection between said supporting means and the film gate for moving the film gate horizontally and in the same direction as the horizontal movement of the lens mount, said motion transmitting connection being proportioned to move the film gate by a distance equal to the lens movement multiplied by the ratio of the gate spacing from the screen to the lens spacing from the screen.

5. Projection apparatus including a mount for a lens through which an image is projected on a screen, supporting means for the lens mount movable to adjust the lens vertically, other supporting means for the lens mount movable to adjust the lens horizontally, a film gate for determining the edges of an image projected on a screen through a film located at the gate, supporting means on which the film gate is movable vertically, other supporting means for the film gate that are movable horizontally, a motion transmitting connection between the supporting means that effect vertical movement of the lens mount and those on which the film gate is movable vertically, said motion transmitting connections being constructed and arranged to cause vertical movement of both the lens mount and film gate in the same direction and with the extent of motion of the lens mount and film gate proportional to the ratio of the gate spacing from the screen to the lens spacing from the screen, and similar motion transmitting connections between the supporting means that move horizontally for adjusting the film gate and lens mount, said similar motion transmitting connections being also proportioned to cause the movement of the lens mount and film gate to be in the ratio of the spacing of the lens mount and film gate from the screen.

6. Projection apparatus including a lens mount, supporting means for the lens mount movable horizontally to adjust the position of the lens, a film gate for determining the edges of a projected image, and motion-transmitting connections between the film gate and the lens mount supporting means for moving the film gate horizontally in response to horizontal movement of the lens mount, but for a different horizontal distance from that moved by the lens mount.

7. Projection apparatus comprising a lens mount, supporting means for the lens mount and with respect to which the lens mount is movable both vertically and horizontally, a film gate for determining the limits of the image projected on a screen through a lens in said mount, motion-transmitting connections between the lens mount and the film gate for moving the film gate vertically in response to vertical movement of the lens, and other motion-transmitting connections between the film gate and the lens mount for moving the film gate horizontally in response to horizontal movement of the lens, both of said motion-transmitting connections being constructed and arranged to move the film gate for distances different from but correlated with the movement of the lens.

8. Projection apparatus including lens-supporting means movable to shift the lens both vertically and horizontally for controlling the location of an image projected on a screen, a film gate that serves as a mask for determining the limits of the projected image, and motion-transmitting connections between the film gate and lens-supporting means for moving the film gate horizontally in response to horizontal movement of the lens, and vertically in response to vertical movement of the lens, said motion-transmitting connections being constructed and arranged to move the film gate in the same direction to the movement of the lens and for a distance that is greater than the movement of the lens and that has a predetermined ratio to the lens movement.

9. Projection apparatus including a lens support movable to shift the lens horizontally and vertically for controlling the location of a projected image on a screen, a film gate that serves as a mask for determining the limits of the projected image, and motion-transmitting connections between the lens support and the film gate for transmitting both vertical and horizontal movement of the lens support to the film gate, said motion-transmitting connections comprising a compound lever system that moves the film gate down when the lens moves down and that moves the film gate horizontally in the same direction as the horizontal movement of the lens, the lever arms of the compound lever system being so proportioned that the ratio of the movement of the lens to the movement of the film gate is substantially equal to the ratio of the distance between the film gate and the screen to the distance between the lens and the screen.

10. Motion picture projection apparatus including, in combination, a guide along which a film is moved with intermittent motion, a lens through which an image of the film is projected on a screen, means for giving the lens components of movement both vertically and horizontally in directions transverse of the axis of the lens, said means including a lens support, guideways in which the lens support is movable in the direction of one of said components, a carriage by which the guideways are supported, other guideways on which the carriage is movable in the direction of the other of said components, a motor for moving the lens support along the guideways, another motor for moving the carriage along said other guideways, automatic control means for both of the motors including light-sensitive devices that are in the path of light projected through control apertures of the film for operating the motors to maintain images of the control apertures in a definite location and thus maintain the image of the film in a definite location on the screen.

11. Motion picture projection apparatus for projecting an image that constitutes an area of a mosaic picture on a screen with at least one edge of the image abutting another area of the mosaic picture, said apparatus including a projector comprising a film gate, a lens mount, apparatus for advancing a film, mechanism that moves a portion of the projector in directions that change the location of the projected image area vertically on the screen, other mechanism for moving a portion of the projector in directions that change the location of the image area horizontally on the screen, and separate control means for the respective mechanisms, said control means including light-responsive devices located in front of the projector in the path of light projected through the film.

12. Motion picture projection apparatus for projecting an image that constitutes an area of a mosaic picture on a screen with at least one edge of the image abutting another area of the mosaic picture, said apparatus including a projector comprising apparatus for advancing a film, a film gate, a lens mount, supporting means for the film gate and lens mount constructed and arranged to provide relative movement of the film gate and lens mount both vertically and horizontally in directions transverse of the axis of a lens in said lens mount to change the location of the projected image area and of the edges of the area both vertically and horizontally, adjusting mechanism for producing the relative vertical movement of the film gate and lens mount, other adjusting mechanism for producing the relative horizontal movement of the film gate and lens mount, separate electric motors for operating each of the adjusting mechanisms, control means for one motor including a light responsive device, and control means for the other motor including a second light responsive device, both of the light responsive devices being located in front of the path of light that is projected through the film.

13. Apparatus for projecting an image that is to constitute an area of a mosaic picture on a screen, which area abuts with another area along at least one edge of the image, said apparatus including a projector comprising parts through which a light beam passes between the film and the screen, said parts including a film gate and including also a lens mount that is movable transversely of the light beam in two angularly related directions, apparatus for advancing a film, mechanism that moves the lens mount with respect to both the film and film gate and across the light beam in each of said two directions, motor means for operating said mechanism, and automatic controls for the motor means including light sensitive devices located in front of the projector and in the path of a portion of the light beam that is projected through the film.

14. Apparatus for projecting an image that is to constitute an area of a mosaic picture on a screen, which area abuts with another area along at least one edge of the image, said apparatus including a projector comprising parts through which a light beam passes between the film and the screen, said parts including a film gate and a lens mount each of which is independently mounted for movement with respect to the film, apparatus for advancing a film, mechanism that produces relative movement of both the film gate and the lens mount with respect to the film in directions transverse of the direction of the light beam to change the location of the image on the screen with respect to the next adjacent image of the mosaic picture, said mechanism including means that controls the extent of movement of the film gate with respect to that of the lens mount, a motor for operating said mechanism and automatic control means for the motor including light sensitive devices located adjacent to the screen and in the path of a beam of light projected through a light aperture in the film.

FRED WALLER.
WILLIS ROBERT DRESSER.

REFERENCES CITED

The following references are of record in the file of this patent:

UNITED STATES PATENTS

| Number | Name | Date |
|---|---|---|
| 545,423 | Chase | Aug. 27, 1895 |
| 645,949 | Frawley | Mar. 27, 1900 |
| 1,165,147 | Wells | Dec. 21, 1915 |
| 1,347,103 | Killman | July 20, 1920 |
| 1,348,566 | Jenkins | Aug. 3, 1920 |
| 1,371,218 | Bingham | Mar. 15, 1921 |
| 1,392,475 | Bingham | Oct. 4, 1921 |
| 1,442,297 | Riedel | Jan. 16, 1923 |
| 1,446,510 | Leventhal | Feb. 27, 1923 |
| 1,454,850 | Gaumont et al. | May 15, 1923 |
| 1,486,226 | Capstaff | Mar. 11, 1924 |
| 1,491,017 | Malm | Apr. 22, 1924 |
| 1,713,663 | Kosken | May 21, 1929 |
| 1,886,581 | Simjian | July 12, 1932 |
| 2,008,020 | Jackman | July 16, 1935 |
| 2,011,932 | Ives | Aug. 20, 1935 |
| 2,016,034 | Concord | Oct. 1, 1935 |
| 2,023,970 | Newman | Dec. 10, 1935 |
| 2,192,987 | Runge | Mar. 12, 1940 |
| 2,203,706 | Stockbarger | June 11, 1940 |
| 2,220,736 | Stockbarger et al. | Nov. 5, 1940 |
| 2,392,142 | Gosswiller | Jan. 1, 1946 |